United States Patent
Murata (10) Patent No.: US 8,852,792 B2
(45) Date of Patent: Oct. 7, 2014

(54) ELECTRICITY STORAGE DEVICE

(75) Inventor: Takashi Murata, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 1080 days.

(21) Appl. No.: 12/517,244

(22) PCT Filed: Mar. 11, 2008

(86) PCT No.: PCT/IB2008/000564
§ 371 (c)(1),
(2), (4) Date: Jun. 2, 2009

(87) PCT Pub. No.: WO2008/120054
PCT Pub. Date: Oct. 9, 2008

(65) Prior Publication Data
US 2010/0062322 A1    Mar. 11, 2010

(30) Foreign Application Priority Data

Mar. 30, 2007  (JP) ................................. 2007-090153

(51) Int. Cl.
| | |
|---|---|
| *H01M 2/00* | (2006.01) |
| *H01M 2/02* | (2006.01) |
| *H01M 2/12* | (2006.01) |
| *H01M 6/50* | (2006.01) |
| *H01M 10/6567* | (2014.01) |
| *H01M 10/6551* | (2014.01) |
| *H01M 2/10* | (2006.01) |
| *H01M 10/613* | (2014.01) |
| *H01M 10/52* | (2006.01) |
| *H01M 10/653* | (2014.01) |
| *H01M 10/625* | (2014.01) |
| *H01M 10/643* | (2014.01) |

(52) U.S. Cl.
CPC ............ *H01M 2/1252* (2013.01); *H01M 10/52* (2013.01); *H01M 6/5038* (2013.01); *H01M 10/5075* (2013.01); *H01M 10/504* (2013.01); *H01M 10/5016* (2013.01); *H01M 2200/00* (2013.01); *H01M 10/5046* (2013.01); *Y02E 60/12* (2013.01); *H01M 2/1016* (2013.01); *H01M 10/5004* (2013.01); *H01M 10/503* (2013.01)
USPC ............. 429/163; 429/175; 429/178; 429/82; 429/71; 429/72

(58) Field of Classification Search
None
See application file for complete search history.

(56) References Cited

U.S. PATENT DOCUMENTS

| | | | |
|---|---|---|---|
| 2,212,368 A | 8/1940 | Hodge | |
| 5,643,691 A * | 7/1997 | Iwatsuki et al. | ................. 429/54 |
| 2007/0204597 A1 * | 9/2007 | Nakano | ........................... 60/276 |

FOREIGN PATENT DOCUMENTS

| | | | |
|---|---|---|---|
| DE | 90 05 603 U1 | 7/1990 | |
| EP | 0 107 469 A2 | 5/1984 | |

(Continued)

*Primary Examiner* — Barbara Gilliam
*Assistant Examiner* — Angela Martin
(74) *Attorney, Agent, or Firm* — Kenyon & Kenyon LLP (57) ABSTRACT

An electricity storage device has an electricity storage unit and a case that contains the electricity storage unit and a coolant for cooling the electricity storage unit. The case includes guide portions on an inner wall surface above the electricity storage unit, each of the guide portions having an oblique portion for, when gas is produced by the electricity storage unit, leading the gas to a predetermined position; and contact portions each of which protrudes in a direction of the electricity storage unit with respect to the oblique portions of the guide portions and is brought into contact with the coolant.

10 Claims, 4 Drawing Sheets

(56) References Cited

FOREIGN PATENT DOCUMENTS

| | | | | |
|---|---|---|---|---|
| EP | 0107469 | * | 5/1984 | ............ H01M 2/12 |
| EP | 0 523 273 A1 | | 1/1993 | |
| EP | 0 691 698 A1 | | 1/1996 | |
| EP | 0691698 | * | 1/1996 | ............ H01M 2/12 |
| JP | 61-042283 U | | 12/1986 | |
| JP | 63-61758 U | | 4/1988 | |
| JP | 63-098953 A | | 4/1988 | |
| JP | 2000-133225 A | | 5/2000 | |
| JP | 2000133225 A | * | 5/2000 | ............ H01M 2/10 |
| JP | 3638102 B | | 1/2005 | |
| JP | 2006-127921 A | | 5/2006 | |
| JP | 2006127921 A | * | 5/2006 | ........... H01M 10/50 |

* cited by examiner

ELECTRICITY STORAGE DEVICE

This is a 371 national phase application of PCT/IB2008/000564 filed 11 Mar. 2008, claiming priority to Japanese Patent Application No. 2007-090153 filed 30 Mar. 2007, the contents of which are incorporated herein by reference.

BACKGROUND OF THE INVENTION

1. Field of the Invention

The invention relates to an electricity storage device in which a case contains an electricity storage unit and a coolant for cooling the electricity storage unit.

2. Description of the Related Art

There is a possibility that, in a battery pack in which a case contains a secondary battery and an insulating oil, heat and gas are produced due to the electrolysis of the electrolyte solution in the secondary battery that is caused by the electricity excessively supplied when the secondary battery is overcharged, for example. For this reason, there have been developed a battery pack that detects gas produced in the battery pack, and a battery pack that detects the change in pressure in the battery pack that occurs due to produced gas, in order to determine whether the battery pack (secondary battery) is in an abnormal state. A battery pack is also available in which, when it is detected that gas is produced, appropriate control is performed according to the abnormality that occurs in the secondary battery (see Japanese Patent No. 3638102, for example).

A battery pack is also available that has a mechanism for discharging gas produced by the secondary battery to the outside of the battery pack (see Japanese Patent Application Publication No. 63-98953 (JP-A-63-98953) (FIGS. 1 and 2), Japanese Utility Model Publication No. 61-42283 (JP-UM-A-61-42283) (FIG. 1), and Japanese Utility Model Application Publication No. 63-61758 (JP-UM-A-63-61758) (FIGS. 1 and 2), for example).

However, Japanese Patent No. 3638102 includes no disclosure concerning a configuration in which gas produced in a secondary battery is efficiently led to a predetermined position (the position at which a gas sensor for detecting gas is positioned, for example). Thus, there is a possibility that the accuracy of detection by the gas sensor can be insufficient.

In a device described in JP-A-63-98953, the lid of a battery case has an oblique surface to lead the gas produced by a cell to a predetermined position (a portion to which a gas-discharge helping device is connected). In this configuration, however, the device is designed so that an insulating oil is brought into contact with the oblique surface of the battery case lid, which causes the following problem.

In the case where, in producing a battery pack, the battery case is enclosed by the lid thereof after a secondary battery and an insulating oil are contained in the battery case, if the battery case lid has the oblique surface as described in JP-A-63-98953, it is required to add the insulating oil to bring the battery case lid into contact with the insulating oil after fixing the battery case lid to the battery case. In this case, the assembly operation of the battery pack becomes complicated.

SUMMARY OF THE INVENTION

An electricity storage device according to a first aspect of the invention has an electricity storage unit and a case that contains the electricity storage unit and a coolant for cooling the electricity storage unit. The case includes: a guide portion on an inner wall surface above the electricity storage unit, the guide portion having an oblique portion for, when gas is produced by the electricity storage unit, leading the gas to a predetermined position; and a contact portion that protrudes in a direction of the electricity storage unit with respect to the oblique portions of the guide portions and is brought into contact with the coolant.

When a plurality of the guide portions are provided in the above electricity storage device, the plurality of guide portions may extend from a peripheral portion of the inner wall surface toward the predetermined position. More specifically, the plurality of guide portions may be formed so as to radially extend from the predetermined position toward edges (the opposed edges of the inner wall surface).

The guide portion may be formed so that a distance from the oblique portion of the guide portion to the electricity storage unit in a gravitational direction increases from the peripheral portion toward the predetermined position.

When a gas sensor for detecting gas is provided in the electricity storage device, the gas sensor may be provided at the predetermined position. In addition, a discharging mechanism, connected to the case at the predetermined position, for leading the gas to the outside of the electricity storage device may be provided.

When the electricity storage unit includes a plurality of electricity storage elements and each of the electricity storage elements has a plurality of terminals, the position to which distances from the plurality of terminals of each of the electricity storage elements are substantially equal to each other may be the predetermined position.

When a pressure sensor for sensing pressure in the case is provided, the pressure sensor may be attached to a connection member for use in electrically connecting a plurality of electricity storage elements that constitute the electricity storage unit. The case may include: a first case member that has an opening through which the case receives the electricity storage unit and the coolant; and a second case member that is fixed to the first case member so as to cover the opening and has the contact portion and the guide portion.

When a plurality of the contact portions are formed on the inner wall surface, the guide portion may be formed between each pair of adjacent contact portions. The oblique portion of the guide portion may be an oblique surface that is positioned between each pair of adjacent contact portions. A configuration may be adopted in which the contact portion is not formed on the part of the inner wall surface that is positioned over the plurality of terminals, but formed on the part of the inner wall surface that is not positioned over the plurality of terminals.

According to the invention, when gas is produced by the electricity storage unit, the gas is led to the predetermined position with the use of the guide portion that has the oblique surface, so that it is possible to efficiently collect the gas at the predetermined position. In addition, because, on the inner wall surface of the case, the contact portion that is brought into contact with the coolant is provided in addition to the guide portion, it is possible to release the heat produced by the electricity storage unit to the outside through the inner wall surface, and it is therefore possible to improve the efficiency of heat dissipation of the electricity storage unit.

Moreover, because the contact portion that protrudes in the direction of the electricity storage unit with respect to the oblique surface of the guide portion is brought into contact with the coolant, there is no need to add the coolant unlike the conventional art, and it is possible to easily assemble the electricity storage device.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Embodiments of the invention will be described below.

Figure 1:
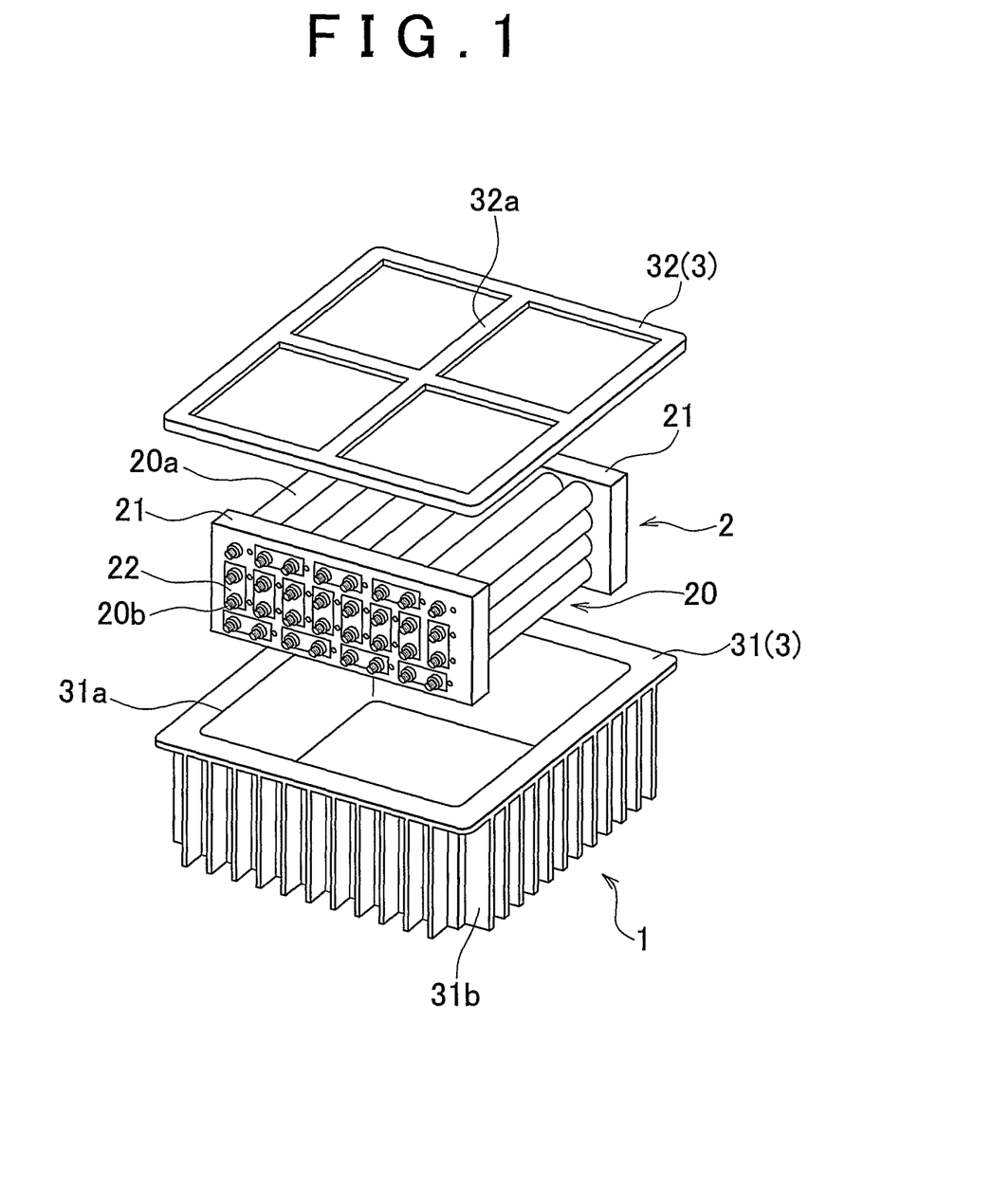
FIG. 1 is an exploded perspective view of a battery pack of a first embodiment of the invention.
Figure 2:
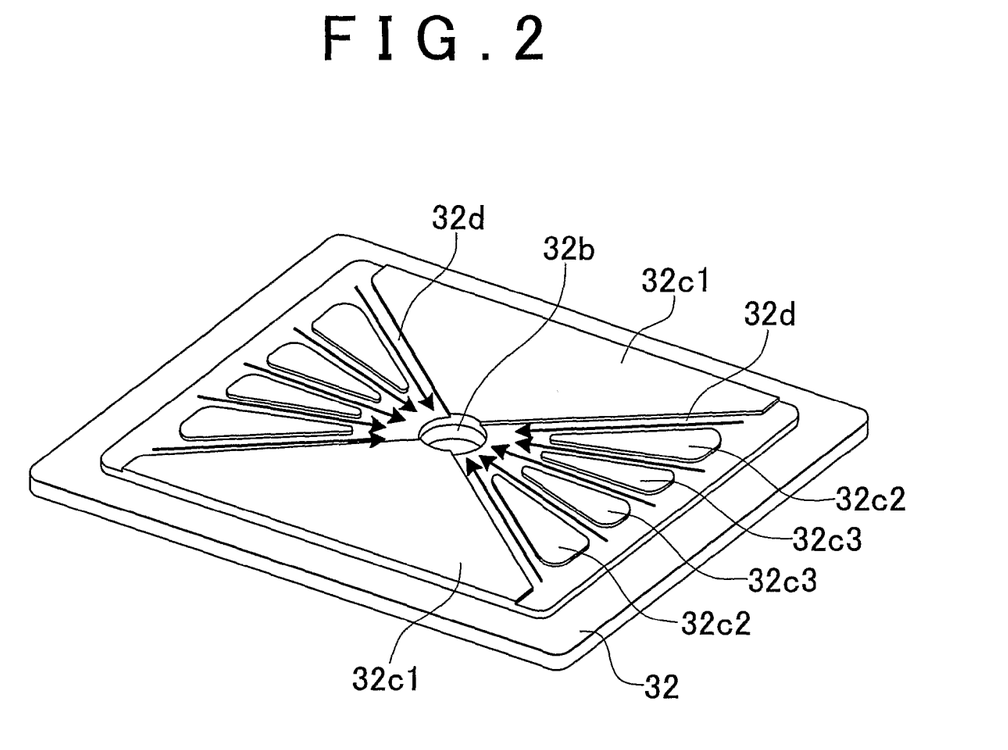
FIG. 2 is a perspective view showing a configuration of an inner wall surface of a second case member used in the battery pack of the first embodiment.
Figure 3:
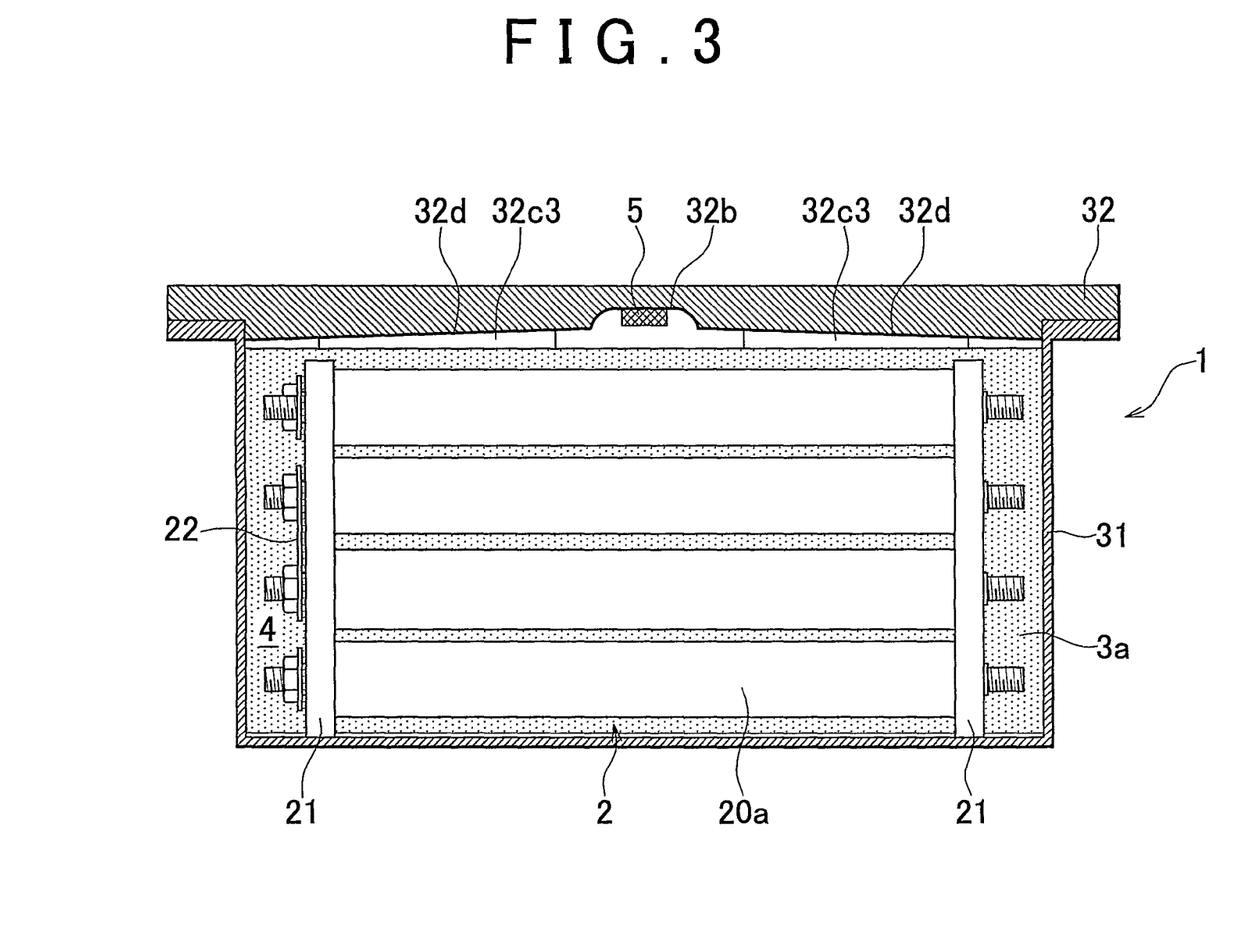
FIG. 3 is a sectional view of the battery pack of the first embodiment.

A battery pack, which is a first embodiment of the invention, will be described with reference to FIGS. 1 to 3. FIG. 1 is an exploded perspective view of the battery pack of the present embodiment. FIG. 2 is a diagram showing a configuration of part of a case of the battery pack according to the present embodiment. FIG. 3 is a sectional view showing an internal configuration of the battery pack of the present embodiment.

The battery pack (electricity storage device) 1 has a battery unit 2 and a case 3, in which the unit 2 is contained. In the present embodiment, the battery pack 1 is mounted on a vehicle. However, the battery pack 1 of the present embodiment can be mounted on a subject other than vehicles.

The battery unit 2 has an electricity storage pack (electricity storage unit) 20, including a plurality of cells (electricity storage elements) 20a, and holding members (so-called end plates) 21 for holding the electricity storage unit 20 at both ends thereof. The cells 20a constituting the electricity storage pack 20 are electrically connected in series by connection members (bus bars) 22. The bus bars 22 are fixed to terminal portions 20b of the cells 20a with nuts.

The bus bars 22 are not fixed to part (two in the present embodiment) of the plurality of cells 20a. The terminals of the cells 20a to which no bus bar is fixed are connected to an electrical component(s) (a motor, for example) outside the battery pack 1 through positive and negative wiring (not shown). Thus, the electricity storage pack 20 is used as a power source of the electrical component(s).

In the present embodiment, a cylindrical secondary battery is used as the cell 20a. Examples of secondary batteries include the nickel-hydrogen battery and the lithium-ion battery. The shape of the cell 20a is not limited to the cylindrical shape, but may be other shapes, such as rectangular shapes. Although secondary batteries are used in the present embodiment, electric double-layer capacitors (condensers) may be used instead of the secondary batteries.

The case 3 has a first case member 31 that provides the bottom and side faces of the case 3, and a second case member 32 that provides the upper face (top face) of the case 3. The top of the first case member 31 has an opening 31a, and the battery unit 2 is received through the opening 31a. The outer surface of the first case member 31 is provided with a plurality of radiator fins 31b for improving heat dissipation capacity of the first case member 31 (that is, the battery unit 2).

The number of radiator fins 31b and the intervals between the radiator fins 31b may be appropriately set. The radiator fins 31b may be omitted.

The first case member 31 is fixed to a vehicle body (not shown) with screws, for example. The vehicle body herein means a floor panel or a frame of the vehicle, for example.

The second case member 32 is put over the opening 31a of the first case member 31 and fixed to the first case member 31 with screws, for example. In this way, an enclosed space for housing the battery unit 2 is created. The second case member 32 is provided with a plurality of frame portions 32a in order to obtain enough strength.

The first and second case members 31 and 32 may be made of a material that is excellent in heat conductivity, corrosion resistance, etc., such as a material that has a heat conductivity equal to or higher than the heat conductivity of a coolant 4 to be described later. Specifically, the first and second case members 31 and 32 may be made of a metallic material, such as copper and iron.

The space enclosed by the first and second case members 31 and 32, which is the space for housing the battery unit 2 and hereinafter also referred to as the housing chamber, is filled with the coolant 4 that is used to cool mainly the battery unit 2 (see FIG. 3).

An electrically insulating oil and an inert liquid may be used as the coolant 4. A silicone oil may be used as the electrically insulating oil. As the inert liquid, Fluorinert, Novec HFE (hydrofluoroether), and Novec 1230 (registered trademarks), made by 3M, which are fluorochemical inert liquids, can be used.

A fan (not shown) as a stirring member may be provided in the housing chamber 3a of the case 3 (see FIG. 3). In this case, it is possible to forcibly flow (circulate) the coolant 4 in the housing chamber 3a by driving (rotating) the fan. Thus, it is possible to improve the efficiency with which the battery unit 2 is cooled using the coolant 4.

Next, a feature of the second case member 32 of the battery pack 1 of the present embodiment will be described with reference to FIGS. 2 and 3.

A recess 32b is formed in a substantially center portion of an inner wall surface (that is, the wall surface facing the battery unit 2) of the second case member 32. In the recess 32b, a gas sensor 5 for detecting the gas produced in the housing chamber 3a, that is, the gas produced by the cells 20a (see FIG. 3).

In addition, a plurality of contact portions 32c1 to 32c3 that are protruded toward the battery unit 2 are formed on the inner wall surface of the second case member 32. In FIG. 2, the contact portions that have the same shape are designated by the same reference numerals. The top surfaces, facing the battery unit 2, of the contact portions 32c1 to 32c3 are flush with each other and are designed to be brought into contact with the surface of the coolant 4 as shown in FIG. 3.

The contact portions 32c1 to 32c3 may be integrally formed with the second case member 32. When the contact portions 32c1 to 32c3 are formed separately from the second case member, the contact portions 32c1 to 32c3 may be made of a material that is excellent in heat conductivity, corrosion resistance, etc. as in the case of the case member, such as a material that has a heat conductivity equal to or higher than the heat conductivity of the coolant 4 to be described later.

Meanwhile, a plurality of guide portions 32d each including an oblique surface that is oblique with respect to the vertical direction (that is, the gravitational direction) of the battery pack 1 are formed between the contact portions 32c1 to 32c3. The plurality of guide portions 32d radially extend toward the edges of the second case member 32 with the recess 32b centered. In the present embodiment, the guide portions 32b extend toward the opposed two of the edges of the second case member 32. These guide portions 32d are provided above the surface of the coolant 4 as shown in FIG. 3. Although, in the present embodiment, the entire guide portion 32d is positioned above the surface of the coolant 4, part of the guide portion 32d may be in contact with the coolant 4.

As shown in FIG. 2, the plurality of guide portions 32d join each other in an area near the recess 32b and in areas near the edges of the inner wall surface of the second case member 32. Thus, in each of the above areas, the plurality of guide portions 32d are formed by one common surface. As shown in FIG. 3, the distance (vertical distance) between the oblique surface of each of the guide portions 32d and the battery unit 2 is the shortest near the edges of the second case member 32, and this distance is the longest around the recess 32b. In addition, the distance between the oblique surface of each of the guide portions 32d and the battery unit 2 increases from the peripheral portion of the second case member 32 to the center portion (recess 32b). The guide portion 32d may be formed by a surface from which the distance to the battery unit 2 varies stepwise.

The output signal from the gas sensor 5 is supplied to a controller (not shown) disposed outside the battery pack 1. The controller detects whether gas is produced by the cells 20a based on the signal from the gas sensor 5. The controller can also be used as the controller for controlling the driving of the vehicle.

For example, as soon as the production of gas in the housing chamber 3a is detected (early stage of the production of gas), the controller performs control to restrict charge and discharge of the electricity storage pack 20. In this way, it is possible to minimize the production of gas by the cells 20a.

Figure 4:
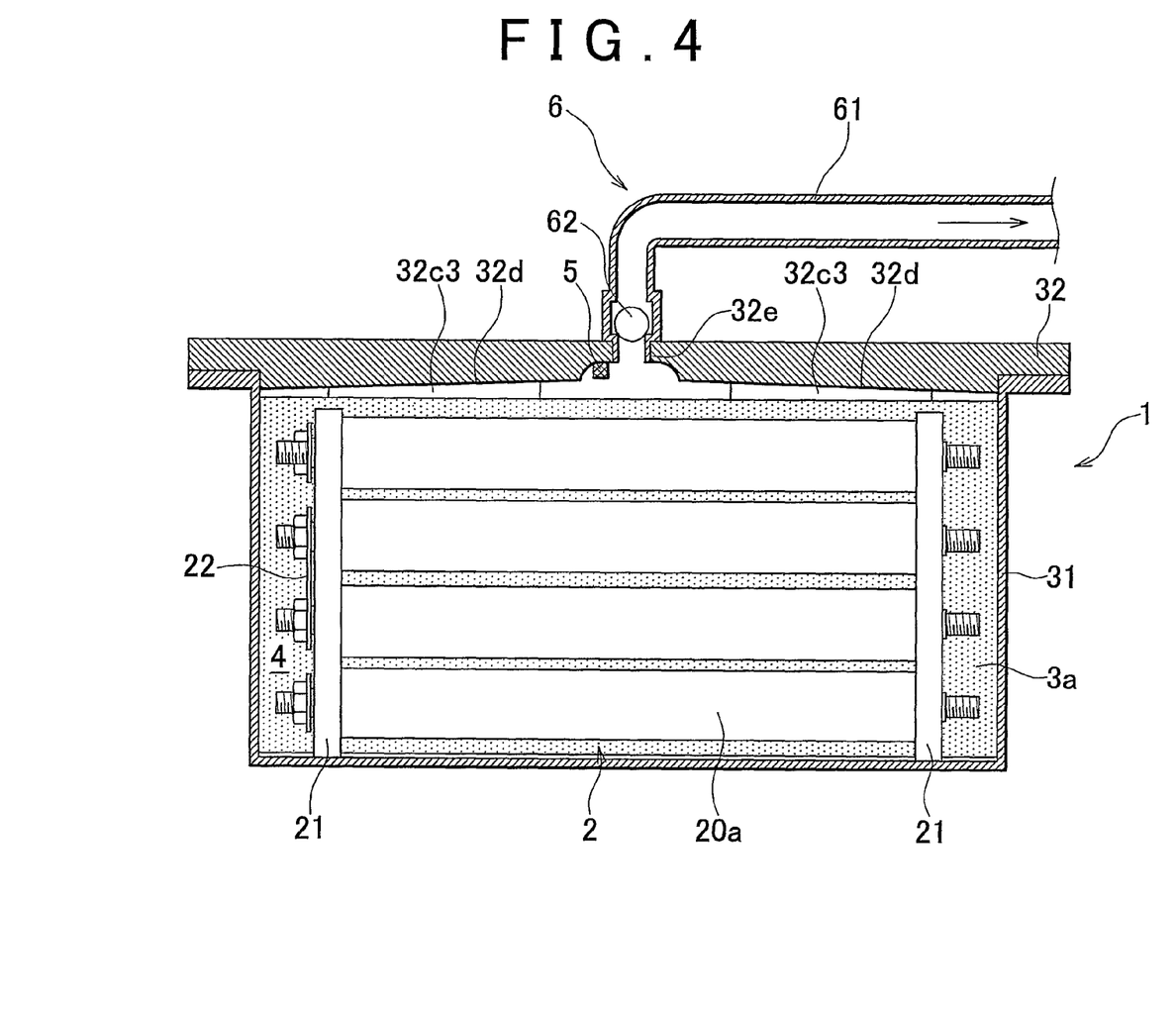
FIG. 4 is a sectional view of a battery pack of a modification of the first embodiment.

Although, in the battery pack 1 of the present embodiment, the case 3 is hermetically sealed as described above, the present invention is not limited to this configuration. For example, instead of the configuration shown in FIG. 3, the configuration shown in FIG. 4 can be adopted. FIG. 4 is a sectional view of a battery pack of a modification of the first embodiment. The member that has the same function as that of the member shown in FIG. 3 is designated by the same reference numeral.

In the configuration shown in FIG. 4, an opening 32e is formed at a position of the recess 32b, and a discharging mechanism 6 for discharging the gas produced in the housing chamber 3a into the outside of the case 3 is provided at the opening 32e.

The discharging mechanism 6 has a duct 61 connected to the opening 32e, and a valve (more specifically, relief valve) 62 provided in part of the duct 61. When the battery pack 1 is mounted on the vehicle shown in FIG. 4, it is possible to discharge the gas produced in the housing chamber 3a into the outside of the vehicle body by extending the duct 62 to an outer surface of the vehicle body (side member, for example). In the configuration shown in FIG. 4, the gas sensor 5 is disposed at the position near the opening 32e where the gas sensor 5 does not obstruct flow of gas.

Although the gas sensor 5 is provided in the configuration shown in FIG. 4, the gas sensor 5 may be omitted. In this case, it is possible to detect the gas produced in the housing chamber 3a by using the valve 62. Specifically, when a mechanism that outputs an electric signal, for example, depending on whether the valve 62 is open or closed is provided, it is possible to detect the production of gas.

In the present embodiment, the coolant 4 with which the case 3 is filled is in contact with the outer surface of the battery unit 2 and the inner wall surface of the first case member 31, so that it is possible to efficiently transfer the heat produced by the battery unit 2 to the first case member 31. Thus, it is possible to dissipate heat through the first case member 31. In addition, in the present embodiment, the contact portions 32c1 to 32c3 formed on the inner wall surface of the second case member 32 are in contact with the coolant 4, so that it is possible to efficiently transfer the heat produced by the battery unit 2 also to the second case member 32. Thus, it is possible to dissipate heat through the second case member 32.

In the present embodiment, the guide portions 32d are formed on the inner wall surface of the second case member 32. Thus, it is possible to efficiently lead the gas produced by the cells 20a to the gas sensor 5, and it is therefore possible to improve the accuracy with which the gas sensor 5 detects gas.

When gas is produced by the cells 20a (terminal portions 20b), the gas flows in the upward direction with respect to the battery pack 1 (toward the second case member 32, that is, the direction opposite to the gravitational direction) because the gas has a specific gravity less than the specific gravity of the coolant 4. When the gas reaches the inner wall surface of the second case member 32, the gas flows along the guide portions 32d. Specifically, because the guide portions 32d are oblique as described above, the gas flows along the guide portions 32d (oblique surface) and is led to the recess 32b as indicated by the arrow in FIG. 2.

As shown in FIG. 3, in the present embodiment, common areas that are part of the guide portions 32d and are located near the edges of the second case member 32, are positioned in the plane (imaginary plane) in which the plurality of terminal portions 20b of the electricity storage pack 20 are disposed, that is, above the plurality of terminal portions 20b. This means that the contact portions are not formed in the areas above the plurality of terminal portions 20b on the inner wall surface of the second case member 32, and the common areas of the guide portions 32d are located in these areas instead. Thus, the gas produced at the terminal portions 20b is efficiently led from the common areas of the guide portions 32d to the recess 32b. In addition, the gas sensor 5 is disposed in the recess 32b, and it is therefore possible to efficiently (that is, accurately) detect the gas produced in the housing chamber 3a by using the gas sensor 5.

Also by forming the inner wall surface of the second case member 32 in a conic shape (see FIGS. 1 and 2 of JP-A-63-98953), for example, it is possible to efficiently lead the gas produced by the cells 20b to the predetermined position (the apex of the conic surface) similarly to the present embodiment. In this case, however, the conic inner wall surface is apart from the surface of the coolant 4. This means that an air space is formed between the conic inner wall surface and the surface of the coolant 4, which results in reduction in the efficiency of heat dissipation through the conic inner wall surface.

However, even when a second case member 32 that has a conic inner wall surface is used, if the coolant 4 is added after the second case member 32 is fixed onto the first case member 31, it is possible to bring the coolant into contact with the conic inner wall surface, and it is therefore possible to improve the efficiency of heat dissipation through the conic inner wall surface. In this case, however, the step of adding the coolant 4 is added, and therefore, the assembly operation of the battery pack 1 becomes complicated.

When the configuration of the present embodiment is adopted, as described above, it is possible to improve the efficiency of heat dissipation of the battery unit 2 and the efficiency with which the gas is guided in the battery unit 2, and it is possible to easily assemble the battery pack 1. That is, with the present embodiment, it is possible to improve the efficiency of heat dissipation of the battery unit 2 and the efficiency with which the gas is guided in the battery unit 2, only by housing the battery unit 2 and the coolant 4 in the first case member 31 and fixing the second case member 32 onto the first case member 31.

Although the gas is guided to the substantially center portion (recess 32b) on the inner wall surface of the second case member 32 in the present embodiment, the place to which the gas is to be led may be another portion than the center portion of the second case member 32. For example, gas may be led to a place near the edges of the inner wall surface of the second case member 32.

It suffices that the recess 32b is provided at the position on the inner wall surface of the second case member 32 to which position the distances from the two terminal portions 20b of each cell 20 are equal to each other. Specifically, it suffices that the recess 32b is positioned so that, when gas is produced by the two terminal portions 20b of a cell 20a, the gas travels along respective paths of which the lengths are substantially equal to each other, to reach the recess 32b. When a fan for stirring the coolant 4 is disposed between one holding member 21 and the side wall of the first case member 31 in the configuration shown in FIG. 3, for example, the position at which the recess 32b is provided is shifted from the center portion of the inner wall surface of the second case member 32.

When the electricity storage device is designed so that gas is led to a substantially center portion of the second case member 32 in accordance with the present embodiment, it is possible to substantially uniformly apply, to the entire inner wall surface of the case 3, the pressure in the housing chamber 3a that builds up when gas is produced. Specifically, when a configuration is adopted in which gas is led to a position offset from the center portion on the inner wall surface of the second case member 32, pressure varies depending on the position on the inner wall surface of the case 3. In short, pressure difference can occur in the housing chamber 3a. This is because, when gas is produced at each of the two terminal portions 20b of a cell 20a, for example, the distances that the gas travels from the respective terminal portions 20b to the recess 32b differ from each other. Thus, when the configuration is adopted in which gas is led to a position offset from the center portion of the second case member 32, there is a possibility that part of the gas is not efficiently led to the recess 32b, and pressure difference can occur in the housing chamber 3a.

In the present embodiment, the plurality of contact portions 32c1 to 32c3 and the plurality of guide portions 32d are provided on the inner wall surface of the second case member 32, and the number of the contact portions 32c1 to 32c3 and the number of the plurality of guide portions 32d may be appropriately set. For example, in the configuration shown in FIG. 2, the contact portions 32c2 and 32c3 may be omitted, and a guide portion 32d that is formed of a single oblique surface may be formed.

However, when the contact portions are omitted, the surface area over which the coolant is brought into contact with the contact portions is correspondingly reduced. Thus, the larger the area in which the contact portions are formed is, the better. In the present embodiment, the dimensions of the contact portions 32c1 to 32c3 in the vertical direction (gravitational direction) of the battery pack 1 (in other words, the amount of protrusion toward the surface of the coolant 4) are substantially equal to each other. However, these dimensions of the contact portions 32c1 to 32c3 may differ from each other. In this case, when a contact portion protrudes more than another contact portion, the former contact portion is dipped into the coolant 4 more than the latter contact portion.

The shape of the contact portions 32c1 to 32c3 is not limited to the shape shown in FIG. 2. The shape is arbitrary as long as the contact portion is brought into contact with the coolant 4.

Although, in the present embodiment, each of the guide portions 32d has an oblique surface, the invention is not limited to this configuration, as long as the guide portions 32d lead gas to the recess 32b. For example, the guide portions may be a plurality of grooves that are formed between the contact portions. In this case, the sectional shape of the groove may be V-shape or a semicircular shape, for example.

In addition to the components of the above-described first embodiment, or in another embodiment than the first embodiment, a pressure sensor for sensing the pressure in the housing chamber 3a may be provided in the housing chamber 3a. Specific description will be given below.

When gas is produced near the terminal portions 20b of the cells 20a, the pressure in the housing chamber 3a increases. In this case, when a pressure sensor is provided in the housing chamber 3a, it is possible to accurately determine the change in pressure in the housing chamber 3a.

Specifically, the pressure sensor may be attached to the battery unit 2, more specifically, a bus bar 22, for example. In this case, it is possible to attach the pressure sensor to the battery unit 2 (bus bar 22) in advance before the battery unit 2 is housed in the case 3 (first case member 31), which makes it easy to assemble the battery pack 1.

Alternatively, when the purpose is to detect the change in pressure in the housing chamber 3a, the pressure sensor may be attached to the inner wall surface of the case 3. However, when the pressure sensor is provided on the battery unit 2 as described above, it is possible to assemble the battery pack 1 with the wiring for the pressure sensor and the wiring for the battery unit 2 bundled together. When a configuration is adopted in which the pressure sensor is provided on a bus bar 22, it is possible to easily attach the pressure sensor to the bus bar 22, and it is also possible to bundle the wiring for the pressure sensor and the wiring for the battery unit 2.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the scope of the invention.

The invention claimed is:

1. An electricity storage device comprising:
an electricity storage unit; and
a case that contains the electricity storage unit and a coolant for cooling the electricity storage unit, wherein,
the case includes:
a top cover having an inner surface facing towards the electricity storage unit, the inner surface having a recess, multiple contact portions that protrude from the inner surface and contacts the coolant, and multiple channels formed between adjacent contact portions, wherein the channels form an oblique upward path towards the recess;
a gas sensor located at the recess.

2. The electricity storage device according to claim 1, wherein the channels extend radially out from the recess towards the periphery of the top cover.

3. The electricity storage device according to claim 1, further comprising a discharging mechanism, connected to the case at the recess for leading the gas to the outside of the electricity storage device.

4. The electricity storage device according to claim 1, wherein:
   the electricity storage unit includes a plurality of electricity storage elements, each of the electricity storage elements has a plurality of terminals, and
   distances from the plurality of terminals of each of the electricity storage elements to the recess are substantially equal to each other.

5. The electricity storage device according to claim 1, further comprising:
   a pressure sensor for sensing pressure in the case, wherein the electricity storage unit includes a plurality of electricity storage elements, and
   the pressure sensor is attached to a connection member for use in electrically connecting the plurality of electricity storage elements.

6. The electricity storage device according to claim 4, further comprising
   a pressure sensor for sensing pressure in the case,
   wherein the pressure sensor is attached to a connection member for use in electrically connecting the plurality of electricity storage elements.

7. The electricity storage device according to claim 4, wherein the contact portion is not formed on part of the inner wall surface that is positioned over the plurality of terminals.

8. The electricity storage device according to claim 5, wherein the contact portion is not formed on part of the inner wall surface that is positioned over the plurality of terminals.

9. The electricity storage device according to claim 1, wherein at least a part of the channels are above the coolant level.

10. The electricity storage device according to claim 1, wherein the inner surface of the top cover has a conical shape.

\* \* \* \* \*